(12) United States Patent
Takahashi et al.

(10) Patent No.: US 9,012,804 B2
(45) Date of Patent: Apr. 21, 2015

(54) LASER LAP WELDING METHOD FOR PARTS MADE OF GALVANIZED STEEL SHEET

(75) Inventors: Masahiro Takahashi, Shizuoka-ken (JP); Tsukasa Hagihara, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 712 days.

(21) Appl. No.: 13/279,905

(22) Filed: Oct. 24, 2011

(65) Prior Publication Data
US 2012/0097651 A1 Apr. 26, 2012

(30) Foreign Application Priority Data

Oct. 25, 2010 (JP) ................................. 2010-238420

(51) Int. Cl.
*B23K 26/24* (2014.01)
*B23K 26/322* (2014.01)
*B23K 26/32* (2014.01)
*B23K 33/00* (2006.01)

(52) U.S. Cl.
CPC ........... *B23K 26/246* (2013.01); *B23K 26/3293* (2013.01); *B23K 33/00* (2013.01); *B23K 2201/18* (2013.01); *B23K 2203/04* (2013.01)

(58) Field of Classification Search
CPC .............. B23K 26/3293; B23K 33/00; B23K 2201/18; B23K 2203/04; B23K 2201/006; B23K 26/3206; B23K 26/246
USPC ..................................................... 219/121.64
See application file for complete search history.

(56) References Cited

U.S. PATENT DOCUMENTS

| 5,104,032 | A | | 4/1992 | Spies et al. |
| 5,626,776 | A | * | 5/1997 | Morris, Jr. ............... 219/121.64 |
| 8,841,577 | B2 | * | 9/2014 | Takahashi et al. ....... 219/121.64 |
| 2005/0011869 | A1 | | 1/2005 | Maura et al. |

(Continued)

FOREIGN PATENT DOCUMENTS

| CN | 1507380 A | 6/2004 |
| CN | 1608302 A | 4/2005 |

(Continued)

OTHER PUBLICATIONS

Machine translation of Japan Patent Document No. 2001-162,388, Jun. 2001.*

(Continued)

*Primary Examiner* — Geoffrey S Evans
(74) *Attorney, Agent, or Firm* — Lerner, David, Littenberg, Krumholz & Mentlik, LLP

(57) ABSTRACT

A laser lap welding method for parts made of galvanized steel sheet includes steps of: press-forming two parts from galvanized steel sheet such that the two parts include elongated joining regions to be welded together on mutually opposed surfaces thereof and a plurality of protrusions are formed on at least any one of the joining regions of the two parts at predetermined intervals in a longitudinal direction of the joining region; retaining the two parts in a state in which the joining regions are overlapped one on the other such that a gap according to a height of the protrusions is formed between the joining regions; and irradiating a laser onto one surface of the overlapped joining regions of the two parts such that the overlapped joining regions are fused and welded by energy of the laser, and zinc gas produced with fusing is discharged through the gap.

5 Claims, 5 Drawing Sheets

(56) References Cited

U.S. PATENT DOCUMENTS

| | | |
|---|---|---|
| 2005/0152741 A1 | 7/2005 | Fujimoto et al. |
| 2006/0175310 A1* | 8/2006 | Fujimoto et al. ......... 219/121.64 |
| 2006/0231534 A1 | 10/2006 | Hill |
| 2007/0084835 A1 | 4/2007 | Dinauer et al. |
| 2008/0217307 A1 | 9/2008 | Dauvel et al. |
| 2009/0134131 A1 | 5/2009 | Lee et al. |
| 2009/0266801 A1 | 10/2009 | Oku et al. |
| 2011/0278266 A1 | 11/2011 | Kobayashi et al. |

FOREIGN PATENT DOCUMENTS

| | | |
|---|---|---|
| DE | 10048233 A1 | 4/2002 |
| DE | 10331745 A1 | 2/2005 |
| FR | 2731373 A1 | 9/1996 |
| JP | 61-135495 A * | 6/1986 |
| JP | 61135495 | 6/1986 |
| JP | 3-193285 A | 8/1991 |
| JP | 04231190 A | 8/1992 |
| JP | 02571976 B2 | 1/1997 |
| JP | 10-216974 A | 8/1998 |
| JP | H10216974 A | 8/1998 |
| JP | 11226765 | 8/1999 |
| JP | 2000326080 A | 11/2000 |
| JP | 2001-162388 A * | 6/2001 |
| JP | 2001-162391 A * | 6/2001 |
| JP | 2001162388 A | 6/2001 |
| JP | 2005144504 A | 6/2005 |
| JP | 03763525 B2 | 4/2006 |
| JP | 2009255179 A | 11/2009 |
| WO | 2010084665 A1 | 7/2010 |

OTHER PUBLICATIONS

Chinese Office Action for Application No. 201110332477.6 dated Feb. 8, 2014.
German Office Action for Application No. DE 10 2011 054 540.9 dated Mar. 2, 2012.
German Office Action for Application No. DE 10 2011 054 542.5 dated Mar. 2, 2012.
Chinese Office Action for Application No. 201110332574.5 dated Nov. 29, 2013.
Japanese Office Action for Application No. 2010-238420 dated May 8, 2014.
Japanese Office Action for Application No. 2010-238419 dated May 8, 2014.
Machine translation of Japan Patent document No. 2001-162,388, May 2014.
Machine translation of Japan Patent document No. 2009-255,179, May 2014.

* cited by examiner

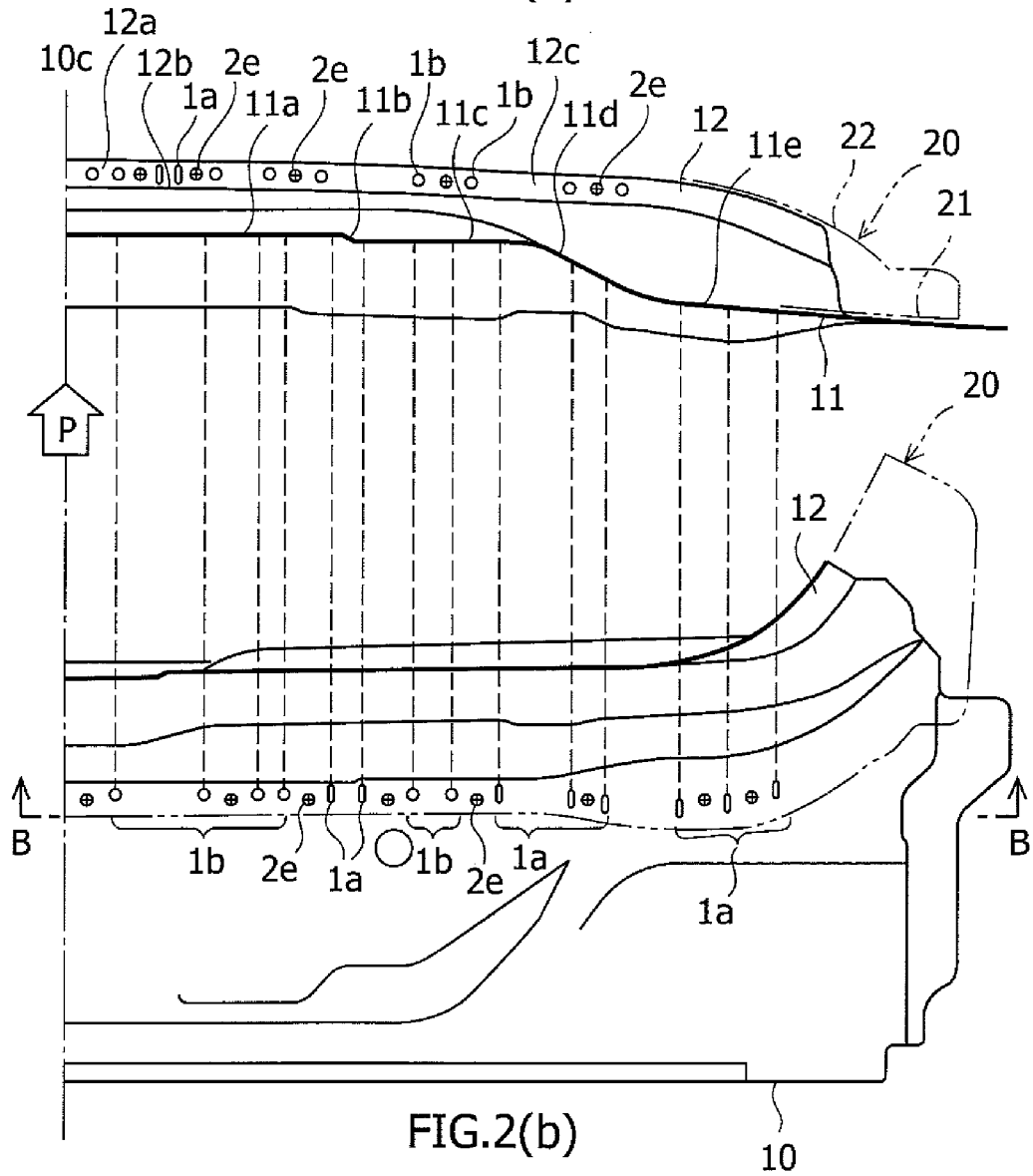
FIG.2(a)
FIG.2(b)
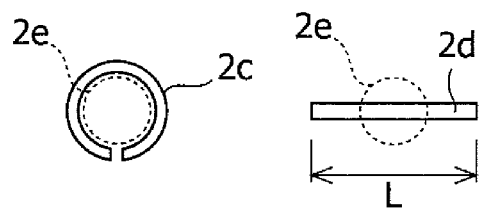
FIG.2(c)  FIG.2(d)

LASER LAP WELDING METHOD FOR PARTS MADE OF GALVANIZED STEEL SHEET

CROSS-REFERENCE TO RELATED APPLICATIONS

The present application claims priority from Japanese Patent Application No. 2010-238420, filed in the Japanese Patent Office on Oct. 25, 2010, the disclosure of which is hereby incorporated herein by reference.

BACKGROUND OF THE INVENTION

The present invention relates to a laser lap welding method for parts made of galvanized steel sheet.

Galvanized sheets are used in many portions of vehicle bodies of automobiles in consideration of corrosion resistance. Panels made of galvanized sheets to form vehicle body parts are press-formed into three-dimensional shapes and are welded together at peripheral portions of such three-dimensional shapes, and thereby form a vehicle body structure based on a hollow cross-section which has an advantage in strength. Generally, such vehicle body panels have been integrated mainly by means of spot welding. However, laser welding is now being introduced as an alternative technique that allows processing at a higher speed.

It is known that vaporized zinc may cause welding failures such as blowholes when galvanized sheets are closely overlapped and welded to each other using a laser, as the vaporized zinc may blow fused metal away or may remain in the fused metal as bubbles. To avoid this problem, JP2571976B and JP10-216974A disclose a technique in which protrusions are formed on any one of galvanized sheets to form a gap for discharging the zinc vapor in a state in which the sheets are overlapped on each other.

Since a vehicle body panel of an automobile is formed by press forming, protrusions are formed on such pressed parts by subjecting the parts to an embossing process with punches arranged inside a press die after a press forming process. However, when performing laser welding on parts originally designed to be suitable for spot-welding, such parts are not designed to allow arrangement of the protrusions necessary for laser welding. As a consequence, there is a problem that the protrusions cannot be located due to limited space and presence of inclinations on a joining surface. There is also another problem that welding positions need to be changed because of the protrusions added.

If the welding positions are changed, a strength performance and an impact resistance performance as a vehicle body structure are changed, whereby the structure will need to undergo performance confirmation tests again. Moreover, the parts that are newly designed cannot directly utilize design data which have been accumulated on the premise of spot welding. Such problems have been considerable obstacles to introduction of laser welding.

Moreover, the press forming is usually unidirectional processing, and the embossing process is also carried out in the same direction as the pressing direction. However, pressed parts for automobiles are formed into three-dimensional shapes with numerous inclined surfaces and curved surfaces. Accordingly, if an embossing process (63) in the same direction as a pressing direction P is carried out on any of these surfaces as shown in FIG. 5A, for example, then the process is not parallel to a processed surface 71.

A protrusion 61 thus processed has an actual apex 61a at a position deviated from the center 63a of a punch 63. Therefore, an amount of projection (g') of the apex 61a is increased in proportion to deviation 61e, and a proper gap cannot be formed in a state where a mating part 81 is lapped over the protrusion 61 as shown in FIG. 5B (a larger gap g' than a designed gap g is formed). Furthermore, when this protrusion 61 is clamped between clamps 64 and 65, a clamp force is unevenly applied to the mating part 81 and it is difficult to maintain an even gap between joining surfaces as a holding condition becomes unstable. Hence, fine weld quality may not be obtained.

BRIEF SUMMARY OF THE INVENTION

The present invention has been made in view of the above-described circumstances. An object of the present invention is to provide a laser lap welding method, which is capable of stably forming an even gap for discharging zinc vapor even when the method is applied to joining surfaces of pressed parts in three-dimensional shapes which may have inclined surface and which may have curved surfaces, and which is capable of achieving fine weld quality.

In order to solve the above-described problems, a laser lap welding method for parts made of galvanized steel sheet, including the steps of: press-forming two parts (10, 20) from galvanized steel sheet such that the two parts include elongated joining regions (11, 21) to be welded together on mutually opposed surfaces thereof and a plurality of protrusions (1) are formed on at least any one of the joining regions (11) of the two parts at predetermined intervals in a longitudinal direction of the joining region; retaining the two parts in a state in which the joining regions are overlapped one on the other such that a gap (g) according to a height of the protrusions is formed between the joining regions; and irradiating a laser (2a) onto one surface of the overlapped joining regions of the two parts such that the overlapped joining regions are fused and welded (2) by energy of the laser, and zinc gas produced with fusing is discharged through the gap (g), wherein the step of press-forming includes processing the plurality of protrusions (1) by punches (3) each projecting in the same direction as a pressing direction (P), and the plurality of protrusions have ridge-shaped protrusions (1a), each of which is located on an inclined portion of the joining region (11d, 11e) with respect to the pressing direction and which extends parallel to a contour line (level line), with respect to the pressing direction, of the inclined portion of the joining region.

According to this method, a contour line with respect to the pressing direction remains flat with respect to the pressing direction even when the joining region is inclined to the pressing direction. Therefore, the ridge-shaped protrusion extending parallel to the contour line can be processed by using a punch having a flat ridge line with respect to the pressing direction. Moreover, the ridge-shaped protrusion can be provided with a constant height from the joining region along the ridge line irrespective of the inclination angle or the curvature of the joining region, so that the even gap for discharging zinc vapor can be stably formed even in the case of the joining regions of the pressed parts having three-dimensional shapes. Hence, fine weld quality can be obtained.

The inclined portions of the joining region (11d, 11e) with respect to the pressing direction is formed as a developable surface parallel to a direction of a reference axis (10c) orthogonal to the pressing direction in the step of press-forming, and each of the ridge-shaped protrusions (1a) is formed as a ridge-shaped protrusion extending in the direction of the reference axis.

Even in the case of the pressed part being formed into three-dimensional shape by applying numerous inclined surfaces and curved surfaces, it is advantageous in terms of formability to form the pressed part into the three-dimensional shapes based on a developable surface that is parallel to a reference axis direction orthogonal to the pressing direction as long as the pressed part is manufactured by subjecting a flat steel plate to deformation processing. By providing the ridge-shaped protrusions extending in the reference axis direction to the joining region of the part, the gap having high dimension accuracy can be stably formed. Moreover, the ridge line direction of each punch for processing the ridge-shaped protrusion is set parallel to the reference axis direction. Accordingly, there is also an advantage that a machine configuration is simplified.

Each joining region (11, 21) is extending in the direction intersecting both the pressing direction and the direction of the reference axis in the step of press forming, and each of the ridge-shaped protrusions (1a) is formed as a ridge-shaped protrusion extending in the direction of the reference axis being substantially orthogonal to the longitudinal direction of the joining region.

By applying the layout of the ridge-shaped protrusion as described above, the even gap can be stably formed between the joining regions toward side ends of the joining regions, namely in the direction to discharge zinc vapor, and fine laser welding can be performed without causing welding failures such as blowholes. Moreover, the ridge-shaped protrusion requires a small area in the longitudinal direction of the joining regions. Hence, the protrusion can be formed without affecting a layout of a region subject to the laser irradiation.

Each of the protrusions (1) is locate between unit spots (2e) each of which is equivalent to individual welding spot when the two parts are spot-welded, and the step of irradiating the laser includes discrete unit laser scanning (2c, 2d) each of which is scanned along a curved line surrounding the unit spot or is scanned so as to obtain a bead area equivalent to the unit spot (2e).

As described previously, the ridge-shaped protrusion requires the small area in the longitudinal direction of the joining regions. Accordingly, the protrusion can be formed without affecting a layout of unit spots equivalent to welding spots for spot welding. Hence, it is possible to obtain joining strength equivalent to the case of spot-welding two parts by subjecting the unit spots to unit laser scanning as described above. In this way, it is possible to utilize existing design data accumulated on the premise of spot welding. This is advantageous for introducing laser welding as an alternative technique to replace spot welding. Lower power consumption is another advantage because the minimum laser scanning is required therein. Meanwhile, laser welding does not cause a problem such as a non-effective shunt current to a welded spot as observed in spot welding. Accordingly, it is also possible to enhance joining strength locally by adding laser scanning to spaces between the unit spots.

The laser lap welding method according to the present invention is particularly performed preferably when the two parts (10, 20) are panels forming a vehicle body of an automobile, and at least one of the joining regions (11, 21) is a flange (21) provided along a periphery of corresponding one of the panels.

As described above, according to the laser lap welding method for galvanized sheet parts according to the present invention, an even gap for discharging zinc vapor can be formed stably between joining regions of pressed parts having three-dimensional shapes including many inclined regions and curved regions, and thereby excellent welding quality can be achieved. Moreover, laser lap welding can be performed under minimum required welding conditions while maintaining similar performances and quality to those attained by spot welding. Therefore, laser lap welding can be introduced at low cost as an alternative technique in place of spot welding.

BRIEF DESCRIPTION OF THE DRAWINGS

FIG. 2A is a cross-sectional view taken along line B-B in FIG. 2B, FIG. 2B is a front view showing the galvanized sheet parts to be subjected to laser lap welding according to the present invention, and FIGS. 2C and 2D are enlarged views of unit laser welding.

FIG. 4A shows an embossing process; and FIG. 4B shows a clamped state.

FIG. 5A shows an embossing process, FIG. 5B shows a clamped state.

DETAILED DESCRIPTION

An embodiment of the present invention will be described below in detail with reference to the accompanying drawings.

Figure 1A:
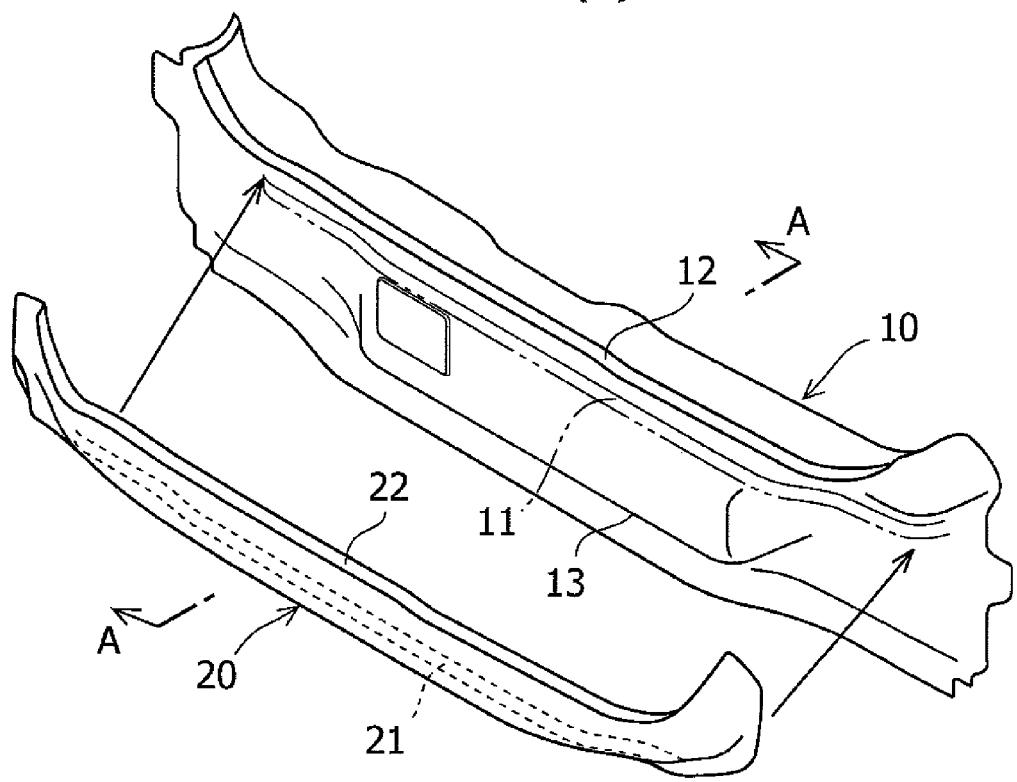
FIG. 1A is a perspective view showing galvanized sheet parts to be subjected to laser lap welding according to the present invention before being joined to each other.
Figure 1B:
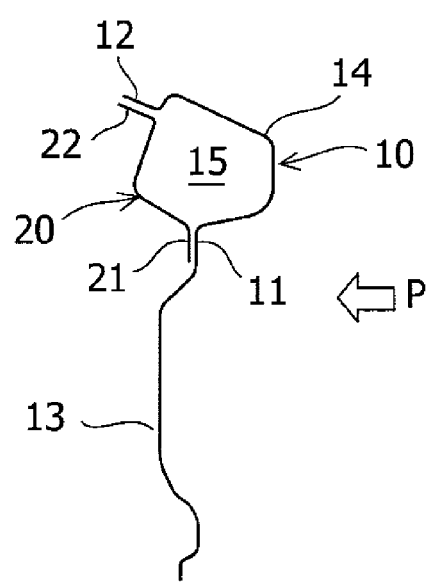
FIG. 1B is a cross-sectional view of the galvanized sheet parts after being joined to each other, which is taken along line A-A in FIG. 1A.

FIG. 1A shows a rear skirt 10 to be located below a back door opening of an automobile and a tail end member to be joined to an upper outer surface side of the rear skirt 10, before being joined to each other, both of which represent an example of galvanized sheet parts to be subjected to laser lap welding according to the present invention. Meanwhile, FIG. 1B shows the galvanized sheet parts after being joined to each other.

The rear skirt 10 has a flange 12 on an upper edge portion thereof. The flange 12 extends in a vehicle width direction and projects toward the rear of the vehicle. An elongated joining region 11 extending in the vehicle width direction is formed on the lower side of the flange 12. A channel structure 14 extending in the vehicle width direction is formed between the joining region 11 and the flange 12. The channel structure 14 has U-shaped cross section opened toward the rear of the vehicle. A portion below the joining region 11 of the rear skirt 10 is practically the portion forming the rear skirt, and a central part in the vehicle width direction thereof is formed into a swelled portion 13 which is swelled toward the rear of the vehicle so as to form a rear wall portion of a spare tire housing (not shown).

A tail end member 20 has flanges 21 and 22. The flange 22 is formed on an upper edge portion of the tail end member 20. The flange 22 extends in the vehicle width direction and projects toward the rear of the vehicle. The flange 21 is formed on a lower end portion of the tail end member 20, and extends in the vehicle width direction and projects downward thereof. Then, as shown in FIGS. 1A and 1B, the flange 22 of the tail end member 20 is lapped over a lower surface of the flange 12 of the rear skirt 10, and the flange 21 of the tail end member 20 is lapped over the joining region of the rear skirt 10. By subjecting the overlapped portions to laser lap welding as described later, a closed cross section 15 that extends in the vehicle width direction is formed between the channel structure 14 of the rear skirt and the tail end member 20. Meanwhile, the welded and joined flanges 12 and 22 collectively form part of a back door opening flange which extends along a lower edge of the back door opening.

In order to introduce gaps for discharging zinc vapor generated at the time of laser lap welding between the respective overlapped portions 11, 21 and 12, 22, a large number of protrusions 1 (1a, 1b) are formed on the joining region 11 and the lower surface of the flange 12 of the rear skirt 10 while providing intervals in an longitudinal direction thereof.

These protrusions 1 (1a, 1b) are formed between unit spots indicated by reference numeral 2e in FIGS. 2A and 2B, that is, the unit spots 2e corresponding to individual welding sports used when spot-welding the rear skirt 10 and the tail end member 20 together, so as to stay away from the unit spots 2e. When performing laser welding, unit laser scanning 2c, 2d (to be described later) as shown in FIGS. 2C and 2D is performed on each of the unit spots 2e. In this way, it is possible to obtain joining strength equivalent to the case of spot-welding two parts.

The rear skirt 10 is formed by press-forming a blank galvanized sheet, and then the protrusions 1 (1a, 1b) are formed by use of punches 3 attached to a press die for an embossing process. Although FIG. 4A is illustrated upside down in comparison with the actual process, the protrusion 1 (1a, 1b) is formed by setting the rear skirt 10 on a lower die including a die 32 with a hole drilled in a position corresponding to a processing region, and then sending the punch 3 out of a hole drilled in an upper die 31 (a holding block), so that the punch 3 pushes the steel plate 11 into the hole in the die 32.

As described previously, since the swelled portion 13 is formed at a lower half of the rear skirt 10, the joining region 11 extending along an upper end of this swelled portion is also formed into a three-dimensional shape. Specifically, as shown in FIG. 1A and FIG. 2A, a first flat surface 11a swelled toward the rear of the vehicle most prominently is formed at a central part in the vehicle width direction of the joining region 11, and second flat surfaces 11c are formed on both sides (only the right side is shown in FIGS. 2A and 2B) of the first flat surface 11a while interposing stepped surfaces 11b therebetween. Furthermore, a first inclined surface 11d at an inclination angle of about 30 degrees and a second inclined surface 11e at an inclination angle of about 5 degrees smoothly continue on both sides of the second flat surfaces 11c.

The rear skirt 10 basically has a symmetrical three-dimensional shape, and the inclined surfaces 11d and 11e, the stepped surfaces 11b, and curved surfaces of transitional portions thereof on the joining region 11 are formed of a developable surface (including the flat surfaces) parallel to an axis of symmetry (reference numeral 10c in FIG. 2B) extending in a vertical direction of the vehicle. For this reason, these surfaces have the same heights with respect to a pressing direction P in the direction parallel to the axis of symmetry 10c. That is, the contour line with respect to the pressing direction P in any position on the joining region 11 is parallel to the axis of symmetry 10c.

Figure 3A:
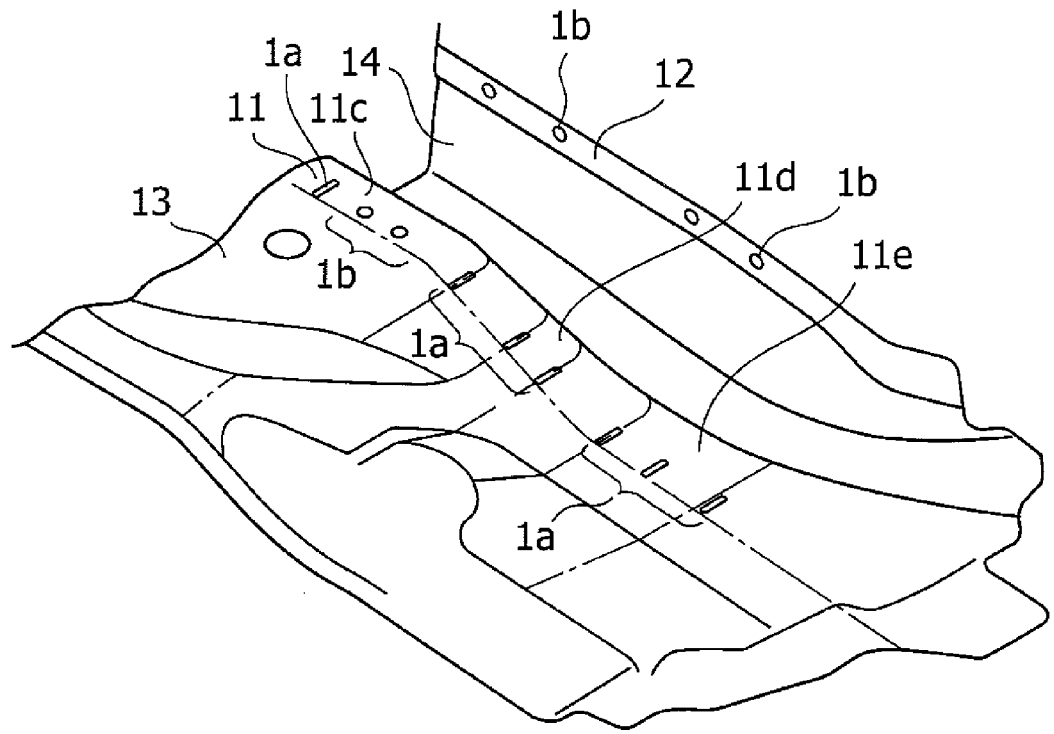
FIG. 3A is a perspective view showing the galvanized sheet parts to be subjected to laser lap welding according to the present invention in a horizontally disposed state and FIG. 3B is an enlarged view of a protrusion therein.
Figure 3B:
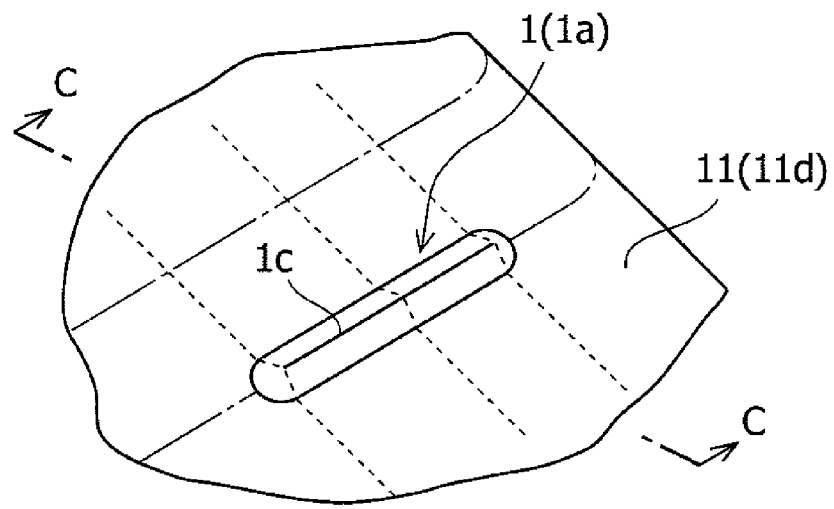
Figure 4A:
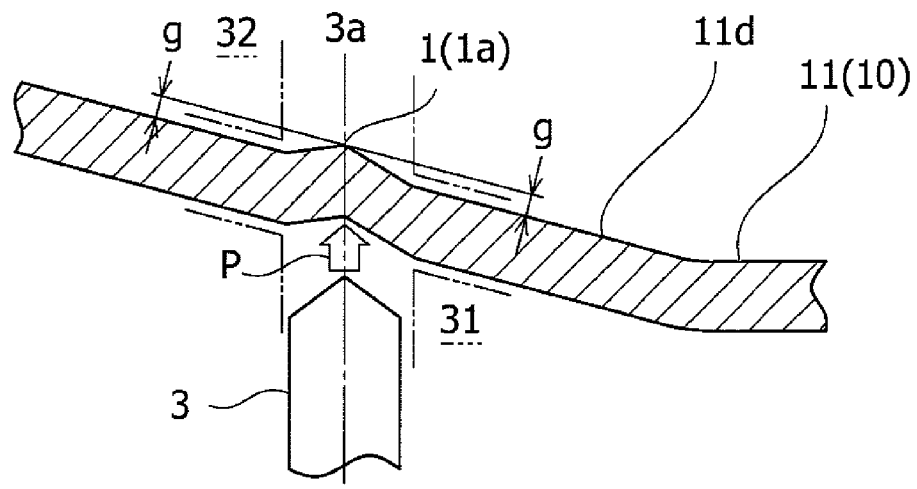
FIGS. 4A and 4B are cross-sectional views of the galvanized sheet parts to be subjected to laser lap welding according to the present invention taken along line C-C in FIG. 3B.
Figure 4B:
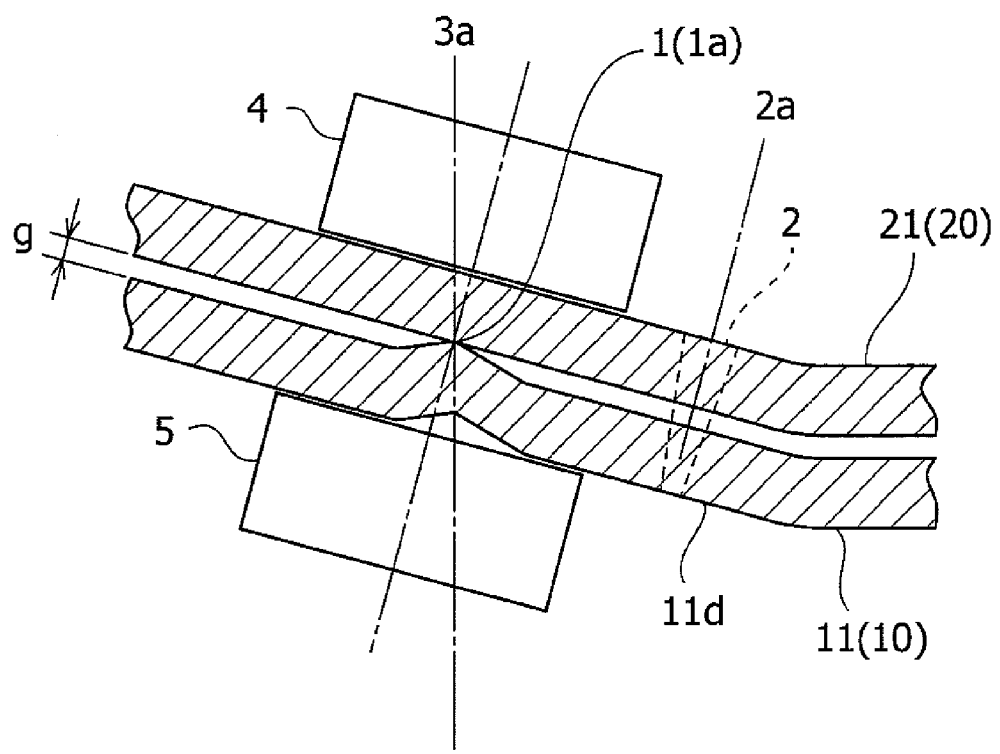
Figure 5A:
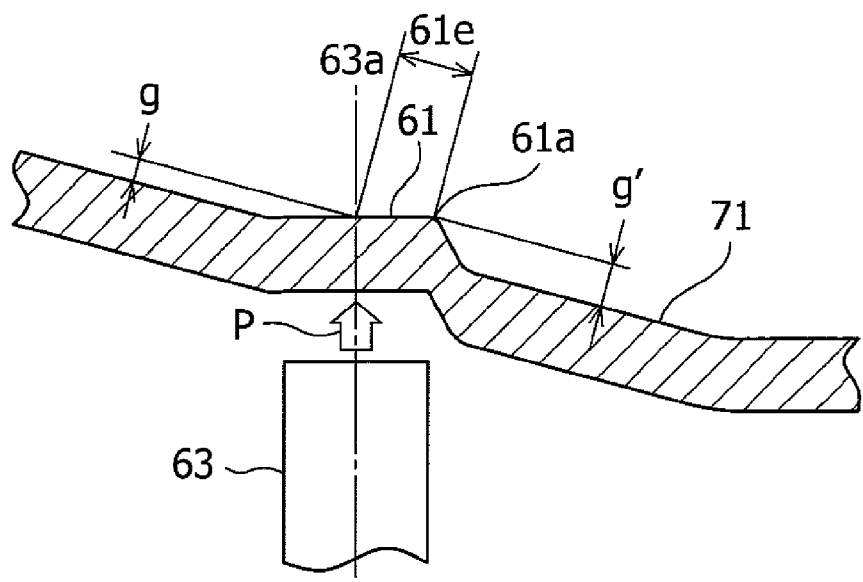
FIGS. 5A and 5B are cross-sectional views of the galvanized sheet parts in a comparative example corresponding to FIGS. 4A and 4B.
Figure 5B:
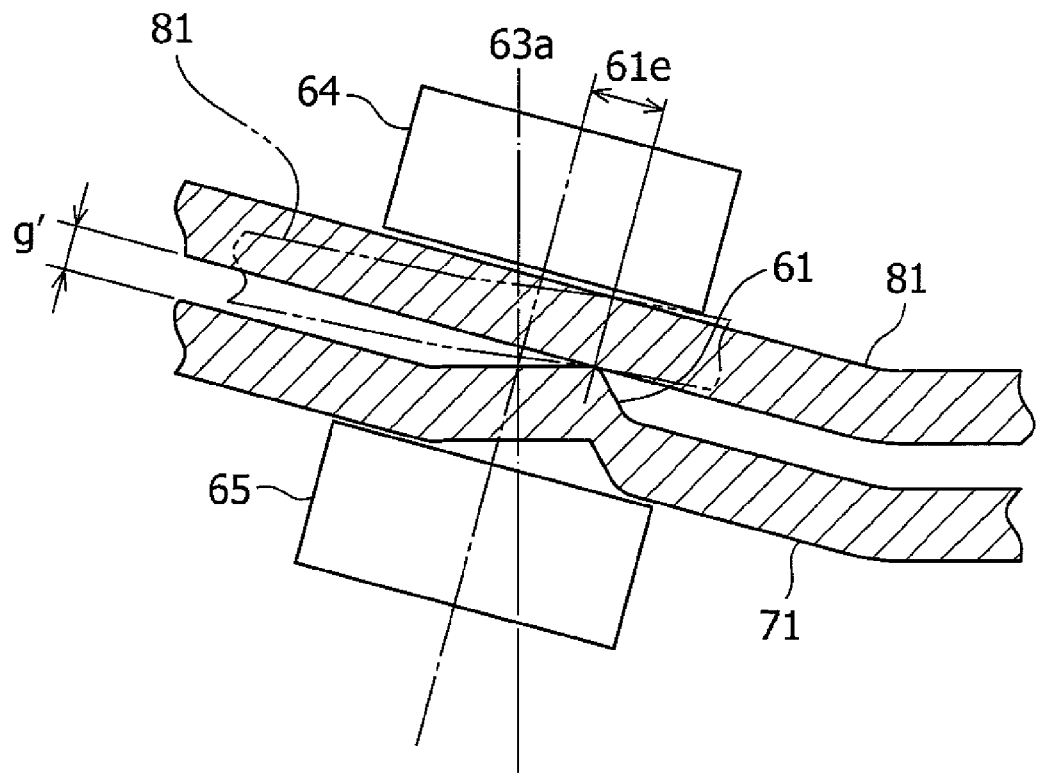

Accordingly, the protrusion 1 provided on each of the inclined surfaces 11d, 11e on the joining region 11 is formed by an embossing process using a punch 3 with a tip having a V-shaped cross section as shown in FIG. 4A and is thereby formed as a ridge-shaped protrusion 1a having a ridge line 1c extending parallel to the axis of symmetry 10c as shown in FIG. 3B. By forming the ridge-shaped protrusions 1a as described above, a uniform height in the direction of the ridge line 1c can be obtained irrespective of the inclination angles of the joining region 11 (11d, 11e), and an even gap g can be formed between the flange 21 of a mating part 20 and the joining region lapping over the flange 21 as shown in FIG. 4B. Moreover, as shown in FIG. 4B, a stably supported state can be obtained when holding the joining region 11 (11d) and the flange 21 of the mating part between clamps 4 and 5 at the position of the protrusion 1a.

On the other hand, each of the protrusions 1 provided on the flat surfaces 11a, 11c on the joining region 11 is formed into a trapezoidal protrusion 1b having a flat circular top surface. In this way, the flange 21 of the mating part 20 can be supported stably in a broad range, and the even gap g can be maintained between the overlapped portions even when reducing the number of the protrusions 1b to be formed by extending intervals therebetween. Meanwhile, the flange 12 of the rear skirt 10 is formed of a flat surface 12a in the center and flat surfaces 12c extending on both sides (only the right side is shown in FIGS. 2A and 2B) of the flat surface 12a while interposing stepped portions 12b therebetween. Accordingly, the protrusions 1 on the flange 12 are formed into the trapezoidal protrusions 1b except two ridge-shaped protrusions 1a adjacent to each of the stepped portions 12b.

As described above, the joining region 11 and the flange 12 of the rear skirt 10 provided with the two types of protrusions 1a, 1b depending on the three-dimensional shape are lapped over the flanges 21 and 22 of the tail end member to form the predetermined gap g between the overlapped portions. Moreover, the unit spots 2e indicated in FIGS. 2A and 2B are subjected to unit laser scanning 2c, 2d as shown in FIGS. 2C and 2D while clamping the rear skirt 10 and the tail end member 20 in multiple positions along the overlapped portions.

Unit laser scanning 2c shown in FIG. 2C represents laser scanning in a circular shape (a curved line shape or a C-shape) surrounding each unit spot 2e. Meanwhile, unit laser scanning 2d shown in FIG. 2D represents straight laser scanning having a length of L obtaining a bead area equivalent to the unit spot 2e. Such laser welding is selectively performed depending on the shape or space of the welding region. Although it is not particularly limited, remote scanner welding with an optical scanning laser welding machine utilizing a galvano scanner is preferable due to configuration to repeatedly perform unit laser scanning 2c, 2d in the constant shapes.

In this embodiment, each of the ridge-shaped protrusions 1a is set to a height of 8 mm and a width of 1 mm while each of the trapezoidal protrusions 1b is provided with the top surface having a diameter of 4 mm. Meanwhile, the height of each of the protrusions 1a and 1b that defines the gap g between the joining regions is set in a range of g=0.15±0.05 mm (0.1 to 0.2 mm), which is less than a half of the thickness of the galvanized sheet (0.6 to 1.2 mm). In the meantime, as for each of unit laser scanning 2c and 2d, circular unit laser scanning 2c having the diameter of 7 mm (while providing a non-continuous portion equal to 1 mm) or straight unit laser scanning 2d having the length L equal to 17 mm is carried out for the unit spot 2e having the diameter of 6 mm which is typical in spot welding. In this way, fine weld quality is achieved without defects attributable to zinc vapor.

The embodiment has described the case of forming the ridge-shaped protrusions 1a being aligned in parallel to the direction of the axis of symmetry 10c on the joining region 11 being formed of the developable surface parallel to the direction of the axis of symmetry 10c. However, the direction of inclination of the inclined surfaces and the curved surfaces is not limited to this configuration. A constant gap g can be obtained irrespective of the inclination angles of the joining region by aligning the ridge-shaped protrusions 1a in the direction orthogonal to the direction of inclination and the pressing direction P, i.e., aligning the ridge-shaped protrusions 1a in the direction of the contour line with respect to the pressing direction P. The punch 3 for that case only needs to have the same shape as described above. Since the ridge-shaped protrusion 1a requires a small area in a direction of arrangement. Accordingly, the protrusion 1a can be formed in a limited space on the joining region and in a region adjacent to any of the stepped portions (11b, 12b), and thus the protrusion 1a has an advantage of a wide applicable range in light of the shape.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A laser lap welding method for parts made of galvanized steel sheet, comprising the steps of:
    press-forming two parts from galvanized steel sheet into three-dimensional shapes such that the two parts include elongated regions to be welded together on mutually opposed surfaces thereof and a plurality of protrusions are formed on at least one of the elongated regions of the two parts at predetermined intervals in a longitudinal direction of the elongated region;
    retaining the two parts in a state in which the elongated regions are overlapped one over the other such that a gap according to a height of the protrusions is formed between the elongated regions; and
    irradiating a laser onto one surface of the overlapped elongated regions of the two parts such that the overlapped elongated regions are fused and welded by energy of the laser, and zinc gas produced with fusing is discharged through the gap,
    wherein the step of press-forming includes forming the plurality of protrusions by punches each projecting in the same direction as a pressing direction and having a tip of V-shaped cross-section, wherein the plurality of protrusions is formed as ridge-shaped protrusions each of which is located on an inclined portion of the elongated region with respect to the pressing direction and which has a ridge line extending parallel to a contour line, which joins points of equal height along the pressing direction, of the inclined portion of the elongated region, and wherein the step of retaining includes clamping across the ridge-shaped protrusions with clamps each having a clamping surface parallel to the inclined portion.

2. The method according to claim 1, wherein the two parts are panels forming a vehicle body of an automobile, and at least one of the elongated regions is a flange provided along a periphery of corresponding one of the panels.

3. The method according to claim 1, wherein the inclined portions of the elongated region with respect to the pressing direction is formed as a developable surface parallel to a direction of a reference axis orthogonal to the pressing direction in the step of press-forming, and each ride line of the ridge-shaped protrusions is parallel to direction of the reference axis.

4. The method according to claim 3, wherein each elongated region further includes a second inclined portion extending in a direction intersecting both the pressing direction and the direction of the reference axis in the step of press forming, and each ridge line of the ridge-shaped protrusions located on the second incline portion is substantially orthogonal to the longitudinal direction of the elongated region.

5. The method according to claim 4, wherein each of the protrusions is located between unit spots each of which is equivalent to individual welding spot when the two parts are spot-welded, and the step of irradiating the laser includes discrete unit laser scanning each of which is scanned along a curved line surrounding the unit spot or is scanned so as to obtain a bead area equivalent to the unit spot.

* * * * *